United States Patent
Oikawa

(10) Patent No.: US 9,789,420 B2
(45) Date of Patent: Oct. 17, 2017

(54) COLD TRAP AND MOUNTING STRUCTURE OF COLD TRAP

(71) Applicant: Sumitomo Heavy Industries, Ltd., Tokyo (JP)

(72) Inventor: Ken Oikawa, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 252 days.

(21) Appl. No.: 14/138,620

(22) Filed: Dec. 23, 2013

(65) Prior Publication Data

US 2014/0174108 A1    Jun. 26, 2014

(30) Foreign Application Priority Data

Dec. 26, 2012 (JP) ................................. 2012-283119

(51) Int. Cl.
| | |
|---|---|
| *B01D 8/00* | (2006.01) |
| *F04B 37/08* | (2006.01) |
| *F04B 37/00* | (2006.01) |
| *F04B 41/06* | (2006.01) |

(52) U.S. Cl.
CPC ................ *B01D 8/00* (2013.01); *F04B 37/00* (2013.01); *F04B 37/08* (2013.01); *F04B 37/085* (2013.01); *F04B 41/06* (2013.01)

(58) Field of Classification Search
CPC ........ F04B 37/00; F04B 37/08; F04B 37/085; B01D 8/00
USPC ........................................................ 62/55.5
See application file for complete search history.

(56) References Cited

U.S. PATENT DOCUMENTS

| | | | |
|---|---|---|---|
| 4,353,222 A | 10/1982 | Kobayashi | |
| 4,407,140 A | 10/1983 | Kobayashi | |
| 4,685,486 A | 8/1987 | Yokoyama | |
| 5,261,244 A | 11/1993 | Lessard et al. | |
| 5,483,803 A | 1/1996 | Matte et al. | |
| 7,992,394 B2 | 8/2011 | Oikawa | |
| 2006/0108013 A1 | 5/2006 | Carmichael | |
| 2009/0266088 A1* | 10/2009 | Oikawa ................... | B01D 8/00 62/55.5 |
| 2010/0000235 A1* | 1/2010 | Tanaka .................... | F04B 37/08 62/55.5 |
| 2010/0011783 A1* | 1/2010 | Aoki ........................ | F04B 37/08 62/55.5 |

FOREIGN PATENT DOCUMENTS

| | | |
|---|---|---|
| CN | 1735767 A | 2/2006 |
| CN | 100419332 C | 9/2008 |
| JP | S56-10302 A | 2/1981 |
| JP | H07-507964 A | 9/1995 |
| KR | 2011-0033655 A | 3/2011 |
| TW | 200944286 A | 11/2009 |
| TW | 201243154 A | 11/2012 |

* cited by examiner

*Primary Examiner* — David Teitelbaum
(74) *Attorney, Agent, or Firm* — Michael Best & Friedrich LLP

(57) ABSTRACT

A cold trap includes a duct, which is for connecting a volume to be evacuated to a vacuum pump, and a cold panel surrounded by the duct. The duct includes an inlet flange at an evacuation target side and an outlet flange at a vacuum pump side. The outlet flange is arranged at a distance from the inlet flange in the extending direction of the duct. The inlet flange has an outer diameter larger than an outer diameter of the outlet flange.

6 Claims, 3 Drawing Sheets

COLD TRAP AND MOUNTING STRUCTURE
OF COLD TRAP

BACKGROUND OF THE INVENTION

1. Field of the Invention

The present invention relates to a cold trap and a mounting structure of the cold trap.

2. Description of the Related Art

A cold trap is an apparatus for removing gases from an atmosphere by freezing and trapping the gases on its surface. In one application, a cold trap is placed before a main vacuum pump. Gases with low equilibrium vapor pressures, such as water vapor, are trapped by the cold trap, while other gases with relatively high equilibrium vapor pressures are removed by the main vacuum pump.

SUMMARY OF THE INVENTION

An exemplary object according to an aspect of the present invention is to provide a cold trap having a high pumping speed and a mounting structure of the cold trap.

According to one aspect of the present invention, there is provided a cold trap provided between a volume to be evacuated and a vacuum pump for evacuation of the volume, the cold trap including: a duct configured to connect the volume to the vacuum pump; and a cold panel surrounded by the duct, wherein the duct includes an inlet flange arranged toward the volume to be evacuated and an outlet flange arranged toward the vacuum pump, the outlet flange is arranged at a distance from the inlet flange in an extending direction of the duct, and the inlet flange has an outer diameter larger than an outer diameter of the outlet flange.

According to another aspect of the invention, there is provided a mounting structure of a cold trap, the mounting structure including: a duct extending from an evacuation target side to a vacuum pump side; an inlet flange provided on the duct at the evacuation target side; and an outlet flange provided on the duct at the vacuum pump side, wherein the inlet flange has an outer diameter larger than an outer diameter of the outlet flange.

It should be noted that any combination of the components described above and any replacement of the components and descriptions of the present invention between methods, devices, systems, and the like are valid as an aspect of the present invention.

BRIEF DESCRIPTION OF THE DRAWINGS

Embodiments will now be described, byway of example only, with reference to the accompanying drawings which are meant to be exemplary, not limiting, and wherein like elements are numbered alike in several Figures, in which.

DETAILED DESCRIPTION OF THE
INVENTION

The invention will now be described by reference to the preferred embodiments. This does not intend to limit the scope of the present invention, but to exemplify the invention.

Figure 1:
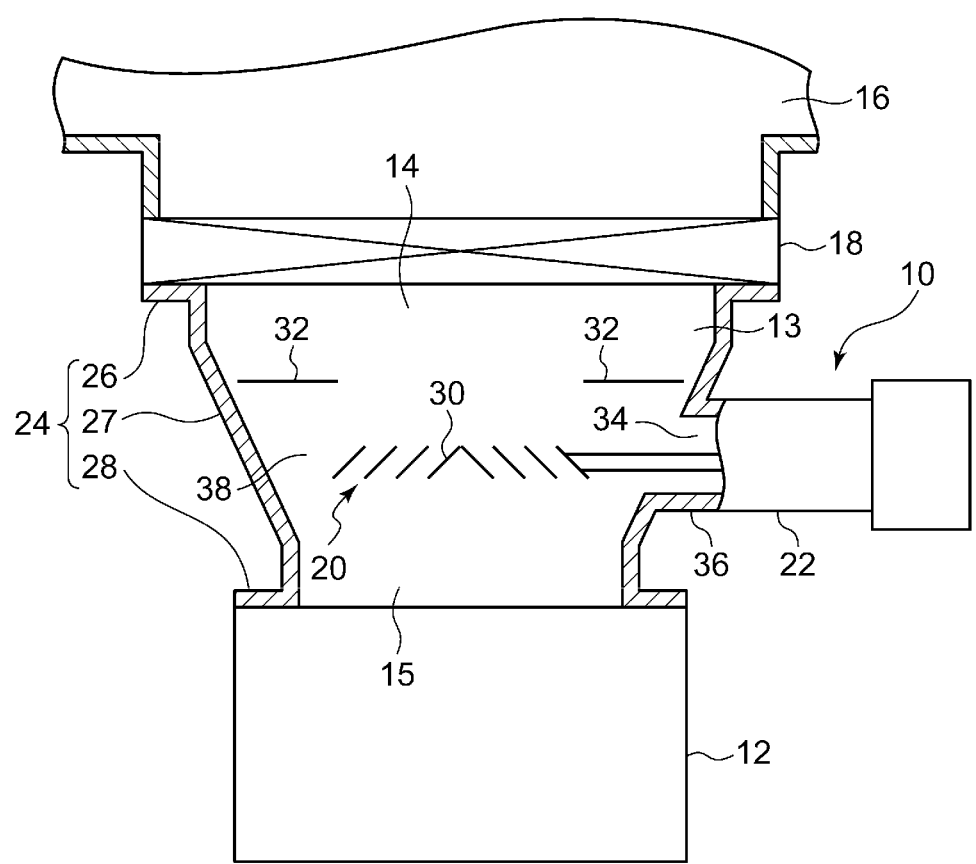
FIG. 1 is a schematic diagram of an evacuation system according to an embodiment of the invention.

FIG. 1 is a schematic diagram of an evacuation system according to an embodiment of the present invention. This evacuation system includes a cold trap 10 and a main vacuum pump (for example, a turbomolecular pump 12) for evacuating a volume to be evacuated (for example, a vacuum chamber 16 of a vacuum processing apparatus). The main vacuum pump is a high vacuum pump for evacuation of up to a high vacuum range. The main vacuum pump may be a diffusion pump. In addition to the main vacuum pump, the evacuation system may include an auxiliary pump for roughly evacuating the vacuum chamber 16.

The turbomolecular pump 12 is connected through an evacuation path 13 to the vacuum chamber 16. The cold trap 10 is arranged between the vacuum chamber 16 and the turbomolecular pump 12. The cold trap 10 is a so-called in-line cold trap. The cold trap 10 is arranged, for example, above the turbomolecular pump 12 in a vertical direction.

Note that terms "axial direction" and "radial direction" may be used herein to facilitate understanding of positional relationships among components. The axial direction represents a direction along the evacuation path 13 (or the extending direction of a duct 24), and the radial direction represents a direction perpendicular to the axial direction. For convenience, relative closeness to the vacuum chamber 16 in the axial direction may be described by terms such as "upper" and "upward", and relative remoteness from the vacuum chamber 16 in the axial direction therein may be described by terms such as "lower" and "downward". In other words, relative remoteness from the turbomolecular pump 12 may be described by terms such as "upper" and "upward", and relative closeness to the turbomolecular pump 12 may be described by terms such as "lower" and "downward". Closeness to the center of the evacuation path 13 in the radial direction may be described by terms such as "inner" and "inside", and closeness to the circumference of the evacuation path 13 in the radial direction may be described by terms such as "outer" and "outside". It should be noted that these terms are not related to an actual position of the cold trap 10 as mounted on the vacuum chamber 16 and the turbomolecular pump 12. For example, the cold trap 10 may be mounted on the vacuum chamber 16 with an outlet opening 15 facing upward in the vertical direction and an inlet opening 14 facing downward in the vertical direction.

The evacuation path 13 is a space for allowing gases to flow from the vacuum chamber 16 to the turbomolecular pump 12. The evacuation path 13 thus has the inlet opening 14 toward the vacuum chamber 16 and the outlet opening 15 toward the turbomolecular pump 12. The gases to be removed flow from the vacuum chamber 16 through the inlet opening 14 into the evacuation path 13, and through the outlet opening 15 into the turbomolecular pump 12.

In the present embodiment, the inlet opening 14 is larger than the outlet opening 15. The inlet opening 14, as observed from the inlet side, encompasses the outlet opening 15. The inlet opening 14 is circular, and the outlet opening 15 is a circle concentric with the inlet opening 14.

A gate valve 18 is provided to isolate the cold trap 10 and the turbomolecular pump 12 from the vacuum chamber 16. The gate valve 18 is provided between an opening of the vacuum chamber 16 and the cold trap 10. The gate valve 18 is above the inlet opening 14 and in proximity to the cold trap 10. The gate valve 18 is opened to allow the evacuation system to communicate with the vacuum chamber 16 so as to be able to evacuate the vacuum chamber 16, and the gate valve 18 is closed to isolate the evacuation system from the vacuum chamber 16. To regenerate the cold trap 10, for example, the gate valve 18 is typically closed.

The gate valve 18 may be arranged as part of this evacuation system, or may be provided at the opening of the vacuum chamber 16 as part of the vacuum processing apparatus. Alternatively, the gate valve 18 may be eliminated, in which case, the cold trap 10 may be mounted directly on the vacuum chamber 16 at its opening. The provision of the gate valve 18 is optional as described above, and thus, the vacuum chamber and the gate valve may be collectively referred to simply as a vacuum chamber herein for convenience of description.

The cold trap 10 includes a cold panel 20 and a refrigerator 22 for cooling the cold panel 20. The cold panel 20 is configured to trap gases on its surface through condensation. The whole cold panel 20 is exposed in the evacuation path 13 and is cooled by the refrigerator 22 to freeze and trap on its surface part of the gases flowing through the evacuation path 13. The cold trap 10 also includes the duct 24 for connecting the vacuum chamber 16 to the turbomolecular pump 12.

The cold panel 20 is arranged along a plane perpendicular to a gas-flowing direction (in an up-and-down direction in FIG. 1) in the evacuation path 13 (i.e. the cold panel is arranged in a side-to-side direction in FIG. 1). In other words, the cold panel 20 extends in the radial direction. An area of the cold panel 20, which is projected in the gas-flowing direction, is set so as to occupy a majority of a cross-sectional area perpendicular to the gas-flowing direction in the evacuation path 13. For example, the cold panel 20 optically closes the evacuation path 13 except a gap from the outer circumferential edge of the cold panel 20 to the inner surface of the duct 24.

The duct 24 defines the evacuation path 13. As described above, the cold panel 20 is arranged in the evacuation path 13, and thus the cold panel 20 is surrounded in the duct 24. Hence, the duct 24 may be referred to as a cold panel housing for accommodating the cold panel 20. The duct 24 has cross-sectional areas varying along the extending direction of the duct 24 with a large bore at its inlet side and a small bore at its outlet side. The inlet bore corresponds to the inlet opening 14, and the outlet bore corresponds to the outlet opening 15. In the illustrated example, the cross-sectional areas of the duct 24 vary continuously from the inlet opening 14 to the outlet opening 15. The duct 24 may have a step between the inlet opening 14 and the outlet opening 15 to vary its cross-sectional areas in a discontinuous manner.

The duct 24 includes two vacuum flanges. The duct 24 includes an inlet flange 26 at an evacuation target side and an outlet flange 28 at a vacuum pump side. The outlet flange 28 is arranged at a distance from the inlet flange 26 in the extending direction of the duct 24 (in the up-and-down direction in FIG. 1). In other words, the inlet flange 26 is away from the outlet flange 28 in the axial direction, and the two flanges are mutually connected through a tubular portion 27 of the duct 24. The inlet opening 14 is formed in the inlet flange 26, and the outlet opening 15 is formed in the outlet flange 28.

The inlet flange 26 is mounted on a flange (not shown) of the gate valve 18, and the outlet flange 28 is mounted on a flange (not shown) of the turbomolecular pump 12. In this embodiment, the gate valve 18 has a nominal diameter larger than a nominal diameter of the inlet flange of the turbomolecular pump 12. To fit the larger diameter of the gate valve 18, the inlet flange 26 of the cold trap 10 has a larger size than the outlet flange 28. For example, the outer and inner diameters of the inlet flange 26 are larger than the outer and inner diameters of the outlet flange 28. The inlet flange 26 is configured to be mountable on the vacuum chamber 16 or the gate valve 18, and the outlet flange 28 is configured to be mountable on the turbomolecular pump 12.

The cold panel 20 includes a central panel 30 and an outer peripheral panel 32. The central panel 30 is, for example, louvered with a plurality of metallic strips. The strips are formed in shapes of side faces of truncated cones with different diameters and arranged concentrically. Alternatively, the central panel 30 may be formed in another shape, such as a chevron or a lattice. The outer diameter of the central panel 30 is smaller than the bore diameter of the outlet opening 15 (in other words, the inner diameter of the outlet flange 28). The outer peripheral panel 32 is, for example, a flat plate in a circular ring shape. Alternatively, the outer peripheral panel 32 may be formed in any shape, as with the central panel 30.

The outer peripheral panel 32 is placed above the central panel 30 in the axial direction. The outer diameter of the outer peripheral panel 32 is larger than the bore diameter of the outlet opening 15. The inner diameter of the outer peripheral panel 32 is equivalent to the outer diameter of the central panel 30. Hence, the central panel 30 can be viewed almost entirely through the center opening of the outer peripheral panel 32 when observed in the axial direction. The outer peripheral panel 32, thus, may be referred to as an upper panel, and the central panel 30 may be referred to as a lower panel.

The central panel 30 is placed so as to cover at least part of the central portion of the evacuation path 13. The outer edge of the central panel 30 is away from the inner surface of the tubular portion 27 of the duct 24. Consequently, an annular space 38 is formed between the central panel 30 and the tubular portion 27 of the duct 24 to allow the inlet opening 14 and the outlet opening 15 to communicate with each other. The outer peripheral panel 32 is placed so as to cover at least part of the annular space 38. The outer peripheral panel 32 extends at the outside of the central panel 30 toward the tubular portion 27. In this way, the cold panel 20 can be divided into a radially inner portion and a radially outer portion.

The outer peripheral panel 32 thus forms an extended portion of the cold panel 20. In other words, by providing the outer peripheral panel 32, the projected area of the cold panel 20 observed in the axial direction is enlarged in the radial direction. This can improve the pumping speed of the cold trap 10.

The cold panel 20 is mounted on a cooling stage of the refrigerator 22. Alternatively, the cold panel 20 may be thermally connected to the cooling stage of the refrigerator 22 by a thermal-conductive component coupling the cooling stage of the refrigerator 22 and the cold panel 20. The refrigerator 22 is, for example, a Gifford-McMahon type refrigerator (generally called a GM refrigerator). The refrigerator 22 is a single-stage refrigerator.

The refrigerator 22 is thermally connected to the central panel 30 of the cold panel 20. The outer peripheral panel 32 is thermally connected to the refrigerator 22 via the central panel 30. Alternatively, the central panel 30 and the outer peripheral panel 32 may be thermally connected to the refrigerator 22 individually to form separate heat transfer paths. In this case, the outer peripheral panel 32 may be connected to the refrigerator 22 without going through the central panel 30.

A side opening 34 is formed in a side face of the tubular portion 27 of the duct 24 to couple the cold panel 20 to the refrigerator 22. A refrigerator housing 36 extends from the periphery of the side opening 34 outward in the radial direction to surround at least part of the refrigerator 22. The duct 24 includes the refrigerator housing 36 for accommodating the refrigerator 22 between the inlet flange 26 and the outlet flange 28 in this way.

In evacuation processing by the evacuation system illustrated in FIG. 1, the gate valve 18 is opened and the turbomolecular pump 12 is actuated to evacuate the vacuum chamber 16 to increase the degree of vacuum to a desired level. Before the turbomolecular pump 12 is actuated, the vacuum chamber 16 may be evacuated with the auxiliary pump for rough evacuation. The cold trap 10 is cooled to a temperature at which water vapor flowing through the evacuation path 13 can be trapped (100 K, for example). Although the turbomolecular pump 12 typically has a relatively low pumping speed for water vapor, a combined use of the cold trap 10 can achieve an increased pumping speed.

Figure 2:
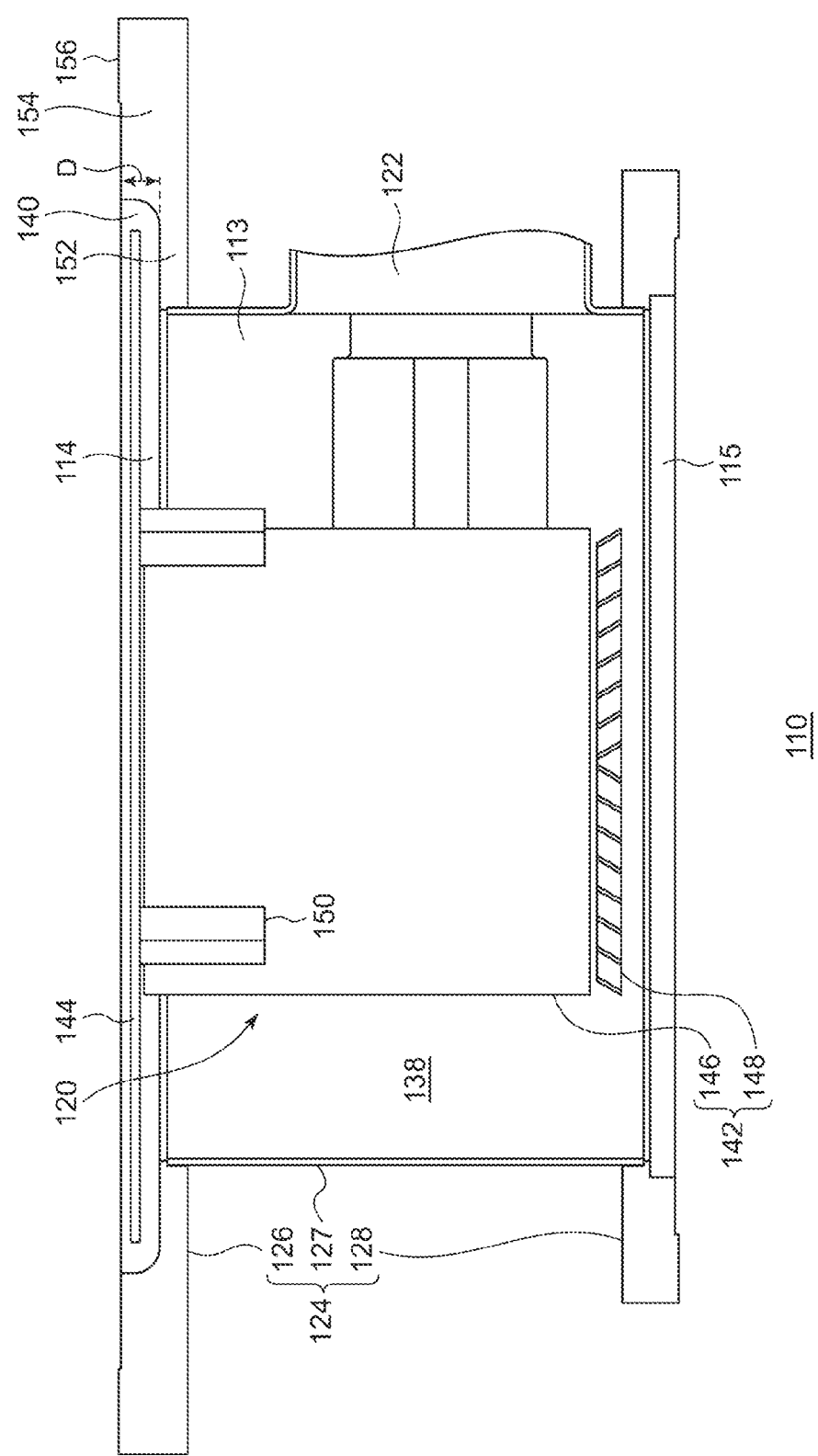
FIG. 2 is a schematic sectional side view of a cold trap according to another embodiment of the invention.
Figure 3:
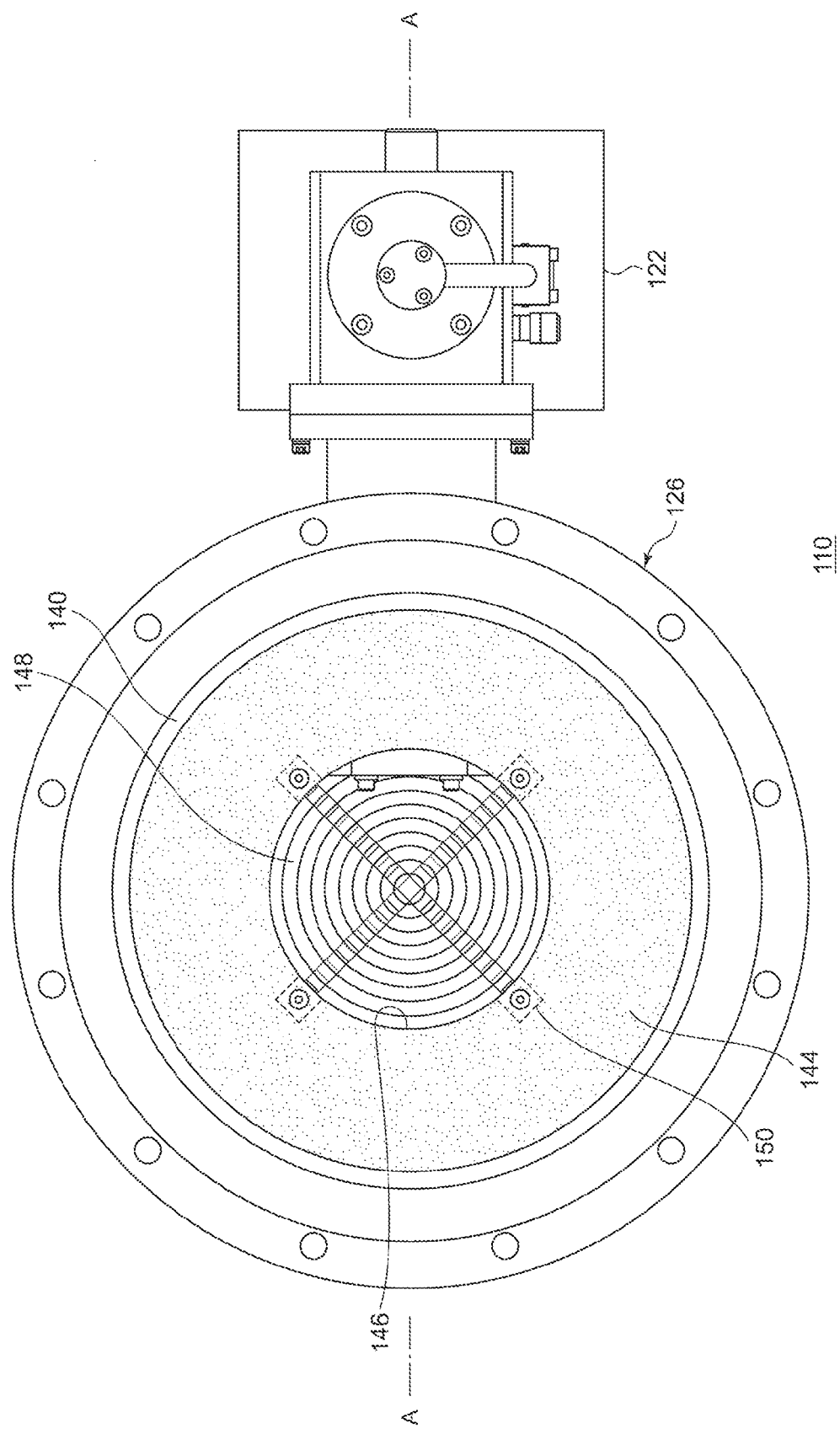
FIG. 3 is a schematic top view of the cold trap according to another embodiment of the invention.

FIGS. 2 and 3 are schematic diagrams of a cold trap 110 according to another embodiment of the invention. FIG. 2 is a sectional view including a central axis of the cold trap 110, and FIG. 3 is a diagram of the cold trap 110 observed from above. The cold trap 110 illustrated in FIGS. 2 and 3 can be combined with the turbomolecular pump 12 to configure an evacuation system for the vacuum chamber 16, as with the cold trap 10 illustrated in FIG. 1. Note that, to avoid redundancy in the description below, components of the cold trap 110 illustrated in FIGS. 2 and 3 corresponding to components of the cold trap 10 illustrated in FIG. 1 will be indicated by like reference numerals and the description thereof may not be repeated here.

In the cold trap 110, a radially outer portion of a cold panel 120 (for example, an extension panel 144) has a larger outer diameter than the inner diameter of a duct 124 at the evacuation target side, as described below in detail. To receive the radially outer portion, a flange recess 140 is formed in an inlet flange 126.

The cold panel 120 includes a main panel 142 and the extension panel 144. The main panel 142 includes a tubular panel 146 and a baffle 148. The extension panel 144, the tubular panel 146, and the baffle 148 are arranged in the sequence set forth from above in the axial direction. The extension panel 144 is between the vacuum chamber 16 (see FIG. 1) and the main panel 142 in the axial direction. The extension panel 144, the tubular panel 146, and the baffle 148 may be referred to as an upper panel, a middle panel, and a lower panel, respectively.

The tubular panel 146 is, for example, cylindrical and extends from an inlet opening 114 toward an outlet opening 115. An upper end of the tubular panel 146 is surrounded by the inlet flange 126. A lower end of the tubular panel 146 is located slightly above an outlet flange 128, and the baffle 148 is arranged between the lower end of the tubular panel 146 and the outlet flange 128. This achieves a double tubular structure having the tubular panel 146 in the form of an inner tube and the duct 124 in the form of an outer tube, with an annular space 138 formed between the tubular panel 146 and the duct 124. A refrigerator 122 is coupled to an axially middle portion of the tubular panel 146, which thereby allows the refrigerator 122 to cool the tubular panel 146. Alternatively, to facilitate flowing of the gases from the inlet opening 114 to the outlet opening 115, the tubular panel 146 may have an opening in its side face.

The baffle 148 has a louvered structure as with the central panel 30 described with reference to FIG. 1. The baffle 148 is configured to optically close an outlet-side opening of the tubular panel 146. The baffle 148 may be of any other shape.

The baffle 148 is mounted on a lower end portion of the tubular panel 146, which thereby allows the baffle 148 to be thermally connected through the tubular panel 146 to the refrigerator 122.

Arranging the baffle 148 downstream from the extension panel 144 and the tubular panel 146 in an evacuation path 113 allows the gases to be trapped mainly by the upstream extension panel 144 and the tubular panel 146. Consequently, the amount of gases collected on the baffle 148 can be reduced. This contributes to maintaining the flowing of the gases through the baffle 148.

The extension panel 144 is a plate in a circular ring shape as with the outer peripheral panel 32 described with reference to FIG. 1. The extension panel 144 may be of any other shape. The extension panel 144 is surrounded by the inlet flange 126. The extension panel 144 is placed so as to cover the annular space 138 between the tubular panel 146 and the duct 124. The inner diameter of the extension panel 144 is substantially identical to the outer diameter of the tubular panel 146. The extension panel 144 extends the main panel 142 outward in the radial direction.

The extension panel 144 is mounted on an upper end portion of the tubular panel 146 by using panel attachments 150. The panel attachments 150 are, for example, formed at regular intervals in a circumferential direction (for example, every 90°) on the upper end portion of the tubular panel 146. The extension panel 144 is fixed to the panel attachments 150 (illustrated with dashed lines in FIG. 3) with an appropriate technique, such as with bolts, as illustrated in FIG. 3. The extension panel 144 is thermally connected to the refrigerator 122 through the tubular panel 146 in this way. The extension panel 144 is shaded in light grey in FIG. 3 to facilitate understanding.

The inlet flange 126 is formed so as to surround the inlet opening 114. The inlet flange 126 extends outward in the radial direction from an upper end of a tubular portion 127 of the duct 124. The inlet flange 126 is provided along the entire circumference of the duct 124. The inlet flange 126 is a vacuum flange for mounting the cold trap 110 on the vacuum chamber or the gate valve.

The inlet flange 126 is configured to fit the cold trap 110 with the vacuum chamber or the gate valve. For example, the nominal diameter of the inlet flange 126 is in agreement with the nominal diameter of an opening of the vacuum chamber or the gate valve. In an alternative example where the opening to which the inlet flange 126 is to be mounted on has a rectangular shape, the inlet flange 126 has a nominal dimension identical to a nominal dimension of the rectangular shape.

The outlet flange 128 is formed so as to surround the outlet opening 115. The outlet flange 128 extends outward in the radial direction from a lower end of the tubular portion 127 of the duct 124. The outlet flange 128 is provided along the entire circumference of the duct 124. The outlet flange 128 is a vacuum flange for mounting the cold trap 110 on the main vacuum pump, such as the turbomolecular pump.

The outlet flange 128 is configured to fit the cold trap 110 with the main vacuum pump. For example, the nominal diameter of the outlet flange 128 is in agreement with the nominal diameter of an inlet flange of the main vacuum pump.

The duct 124 is a pipe having a consistent bore diameter across the extending direction thereof. The duct 124 has a short tubular shape with its length shorter than its diameter, as illustrated. The duct 124 extends linearly from the inlet opening 114 to the outlet opening 115. Alternatively, the duct 124 may extend in the extending direction of the duct 124 longer than the diameter of the duct 124. The duct 124 may extend from the inlet opening 114 to the outlet opening 115 with a bend or a curve therebetween.

The inlet flange 126 includes an inner periphery portion 152 and an outer periphery portion 154. A height difference D is formed between the inner periphery portion 152 and the outer periphery portion 154 in the axial direction. The inner periphery portion 152 is provided at the outside, in the radial direction, of the upper end of the tubular portion 127 of the duct 124.

The outer periphery portion 154 is provided for mounting of the cold trap 110. The outer periphery portion 154 is a protrusion protruding upward in the axial direction at the outside of the inner periphery portion 152 in the radial direction. The outer periphery portion 154 is thicker in the axial direction than the inner periphery portion 152. An upper end surface of the outer periphery portion 154 is a mating surface 156 for the mounting. As the inlet flange 126 is mounted on the vacuum chamber or the gate valve, the mating surface 156 comes in contact with the vacuum chamber or the gate valve. A lower surface of the outer periphery portion 154 is flush with a lower surface of the inner periphery portion 152.

The height difference D of the inlet flange 126 is formed between the mating surface 156 and an upper surface of the inner periphery portion 152. The height difference D forms the flange recess 140 to receive the extension panel 144. The flange recess 140 is an annular space to accommodate the outer periphery of the extension panel 144 and constitutes a part of the evacuation path 113. The flange recess 140 is formed along the entire circumference of the inlet flange 126. A gap is formed between the flange recess 140 and the extension panel 144. The extension panel 144 is surrounded by the inlet flange 126 with no contact with the inlet flange 126.

The extension panel 144 is surrounded by the flange recess 140 in the axial direction in addition to the radial direction. Thus, the extension panel 144 can extend the cold panel 120 without an interference with a component located above the extension panel 144, such as the gate valve. The extension panel 144 may, however, protrude upward beyond the flange recess 140 as long as there is no interference with a component located above the extension panel 144, such as the gate valve.

In this embodiment, the inner diameter of the inlet flange 126 is larger than the inner diameter of the outlet flange 128. Thus, the opening diameter of the cold trap 110 at the inlet side is larger than the opening diameter at the outlet side. By providing a large opening area at the evacuation target side in this way, gases (for example, water vapor) in the volume to be evacuated enter the evacuation path 113 with ease. This can increase the pumping speed (for water, for example) of the cold trap 110.

In this embodiment, the extension panel 144 is provided to extend the cold panel 120. An effective area (in other words, a projected area when observed in the axial direction) contributing to the pumping speed is enlarged in this way. Thus, the pumping speed (for water, for example) by the cold trap 110 can be improved. Additionally, the extension panel 144 is extended outward in the radial direction, which can thereby increase the area of the panel further in comparison with the extension panel 144 extended inward in the radial direction. Arranging the extension panel 144 at the inlet opening 114 also contributes to increasing the pumping speed.

The addition of such an extended portion increases the pumping speed for water, and thus a main vacuum pump with a smaller bore may be able to meet a required pumping speed. In existing evacuation systems, however, components, such as a gate valve, a cold trap, and a main vacuum pump, have an identical bore diameter, in general. In this embodiment, the inlet flange 126 has a large size and the outlet flange 128 has a small size. Consequently, a main vacuum pump with a small bore can be actually used for the opening of a vacuum chamber or a gate valve with a large bore. The use of a small sized main vacuum pump contributes to a cost reduction of a vacuum system.

The above has described the present invention based on some embodiments. Those skilled in the art will appreciate that the present invention is not limited to the embodiments described above, that various design changes and modifications are possible, and that such modifications are within the scope of the present invention.

In one embodiment, the cold panel includes a radially inner portion and a radially outer portion, and the radially outer portion may be placed between the radially inner portion and the volume described above in the extending direction described above. This allows the radially outer portion of the cold panel to be arranged in proximity to the volume to be evacuated. The radially outer portion may have an outer diameter larger than the inner diameter of the duct at the vacuum pump side. The radially outer portion may have an outer diameter larger than the inner diameter of the duct at the evacuation target side, and the inlet flange may have a recess to receive the radially outer portion. The radially outer portion of the cold panel can be extended in this way.

It should be understood that the invention is not limited to the above-described embodiment, but may be modified into various forms on the basis of the spirit of the invention. Additionally, the modifications are included in the scope of the invention.

Priority is claimed to Japanese Patent Application No. 2012-283119, filed on Dec. 26, 2012, the entire content of which is incorporated herein by reference.

What is claimed is:

1. A cold trap provided between a volume to be evacuated and a vacuum pump for evacuation of the volume, the cold trap comprising:
   a single stage refrigerator comprising a cooling stage;
   a duct configured to connect the volume to the vacuum pump and define an evacuation path allowing a gas to flow from the volume to the vacuum pump, the duct comprising a tubular portion extending in a duct extending direction and including a side opening formed in a side face of the tubular portion; and
   a cold panel surrounded by the duct and thermally connected to the cooling stage of the single stage refrigerator, wherein thermal connection between the cooling stage of the single stage refrigerator and the cold panel is provided through the side opening of the duct, wherein
   the duct comprises an inlet flange arranged on a first end with respect to the side opening toward the volume to be evacuated and an outlet flange arranged on a second opposite end with respect to the side opening toward the vacuum pump, the outlet flange arranged at a distance from the inlet flange in the duct extending direction, and
   the inlet flange has an inlet flange outer diameter and an inlet flange inner diameter in a duct radial direction perpendicular to the duct extending direction, the inlet flange inner diameter defining an inlet opening in the inlet flange through which the gas enters from the volume into the evacuation path, the outlet flange has an outlet flange outer diameter and an outlet flange inner diameter in the duct radial direction, the outlet flange inner diameter defining an outlet opening through which the gas is removed from the evacuation path into the vacuum pump, and the inlet flange outer diameter is larger than the outlet flange outer diameter and the inlet flange inner diameter is larger than the outlet flange inner diameter.

2. The cold trap according to claim 1, wherein the cold panel comprises a radially inner portion and a radially outer portion, and the radially outer portion is placed between the radially inner portion and the volume in the duct extending direction, the radially outer portion and the radially inner portion located at different heights in the duct extending direction.

3. The cold trap according to claim 2, wherein the radially outer portion has a cold panel outer diameter larger than the outlet flange inner diameter.

4. The cold trap according to claim 2, wherein the radially outer portion has a cold panel outer diameter larger than the outlet flange inner diameter, and the inlet flange has a recess configured to receive the radially outer portion.

5. The cold trap according to claim 1, wherein the inlet opening, as observed from an inlet side, is larger than the outlet opening.

6. A mounting structure of a cold trap, the cold trap comprising a single stage refrigerator and a cold panel, the mounting structure comprising:

a duct extending from an evacuation target side to a vacuum pump side in a duct extending direction and defining an evacuation path allowing a gas to flow from the evacuation target side to the vacuum pump side, the duct comprising a tubular portion extending in a duct extending direction and including a side opening formed in a side face of the tubular portion, wherein thermal connection between a cooling stage of the single stage refrigerator and the cold panel is provided through the side opening of the duct;

an inlet flange provided on the duct at the evacuation target side and arranged on a first end with respect to the side opening, the inlet flange including an inlet flange outer diameter and an inlet flange inner diameter in a duct radial direction perpendicular to the duct extending direction, the inlet flange inner diameter defining an inlet opening in the inlet flange through which the gas enters from the evacuation target side into the evacuation path; and an outlet flange provided on the duct at the vacuum pump side arranged on a second opposite end with respect to the side opening, the outlet flange including an outlet flange outer diameter and an outlet flange inner diameter in the duct radial direction, the outlet flange inner diameter defining an outlet opening through which the gas is removed from the evacuation path into the vacuum pump side, wherein the inlet flange outer diameter is larger than the outlet flange outer diameter and the inlet flange inner diameter is larger than the outlet flange inner diameter.

\* \* \* \* \*